(12) United States Patent
Peinemann et al.

(10) Patent No.: US 9,914,099 B2
(45) Date of Patent: Mar. 13, 2018

(54) SELF-ASSEMBLED BLOCK COPOLYMER MEMBRANE

(76) Inventors: Klaus-Viktor Peinemann, Thuwal (SA); Suzana Nunes, Thuwal (SA)

(*) Notice: Subject to any disclaimer, the term of this patent is extended or adjusted under 35 U.S.C. 154(b) by 232 days.

(21) Appl. No.: 12/863,519

(22) PCT Filed: Feb. 11, 2010

(86) PCT No.: PCT/IB2010/000386
§ 371 (c)(1),
(2), (4) Date: Sep. 22, 2011

(87) PCT Pub. No.: WO2011/098851
PCT Pub. Date: Aug. 18, 2011

(65) Prior Publication Data
US 2012/0318741 A1    Dec. 20, 2012

(51) Int. Cl.
| | |
|---|---|
| *B01D 71/80* | (2006.01) |
| *B01D 69/14* | (2006.01) |
| *B01D 69/02* | (2006.01) |
| *B01D 67/00* | (2006.01) |
| *C08L 53/00* | (2006.01) |

(52) U.S. Cl.
CPC .......... *B01D 71/80* (2013.01); *B01D 67/0011* (2013.01); *B01D 67/0079* (2013.01); *B01D 69/02* (2013.01); *B01D 69/148* (2013.01); *C08L 53/00* (2013.01); *Y10T 428/249953* (2015.04)

(58) Field of Classification Search
None
See application file for complete search history.

(56) References Cited

U.S. PATENT DOCUMENTS

| | | | | |
|---|---|---|---|---|
| 3,734,897 | A * | 5/1973 | Stoy et al. ............... | 525/371 |
| 3,953,545 | A | 4/1976 | Stoy ........................ | 525/196 |
| 6,592,991 | B1 | 7/2003 | Wiesner et al. .......... | 428/404 |
| 2006/0016750 | A1 | 1/2006 | Merkel et al. ............ | 210/638 |
| 2009/0173694 | A1 | 7/2009 | Peinemann et al. ...... | 210/650 |
| 2010/0155325 | A1 * | 6/2010 | Zhang .................. | B01D 39/1692 |
| | | | | 210/500.21 |
| 2011/0017661 | A1 * | 1/2011 | Kosar .................. | 210/500.27 |
| 2011/0240550 | A1 * | 10/2011 | Moore ................ | B01D 67/0011 |
| | | | | 210/490 |

FOREIGN PATENT DOCUMENTS

| | | |
|---|---|---|
| EP | 2 160 946 | 3/2010 |
| WO | WO 2008/034487 | 3/2008 |

OTHER PUBLICATIONS

Cresce et al., "Block copolymer nanotemplating of tobacco mosaic and tobacco necrosis viruses," *Acta Biomateriala*, 5(3):893-902, 2009.
Dai et al., "Fabrication of 2D ordered structure of self-assembled gold nanoparticles," *Journal of Crystal Growth*, 288(1):128-136, 2006.

(Continued)

*Primary Examiner* — Krishnan S Menon
(74) *Attorney, Agent, or Firm* — Billion & Armitage; Benjamin C. Armitage

(57) ABSTRACT

Embodiments of the invention include methods for the production of porous membranes. In certain aspects the methods are directed to producing polymeric porous membranes having a narrow pore size distribution.

15 Claims, 3 Drawing Sheets

(56) References Cited

OTHER PUBLICATIONS

Furneaux et al., "The formation of controlled porosity membranes from anodically oxidized aluminium," *Nature* 337:147-149, 1989.
Nunes et al (ed)., "Presently available membranes for liquid separation," Chapter *Membrane Technology in the Chemical Industry*, Wiley-VCH, Weinheim, 15-38, Copyright 2006. Published online Oct. 8, 2001.
PCT International Search Report and Written Opinion issued in International application No. PCT/IB2010/000386, dated Dec. 3, 2010.
Peinemann et al., "Asymmetric superstructure formed in a block copolymer via phase separation," *Nature Materials* 6: 992-996, 2007.
Sara et al., "Isoporous ultrafiltration membranes from bacterial cell envelope layers," *Journal of Membrane Science*, 36: 179-186, 2001.
Srinivasaro et al., "Three dimensionally ordered array of air bubbles in a polymer film," Science 292:79-83, 2001.
Yang et al., "Nanoporous membranes with ultrahigh selectivity and flux for the filtration of viruses," *Advanced Materials* 18: 709-712, 2006.

\* cited by examiner

SELF-ASSEMBLED BLOCK COPOLYMER MEMBRANE

CROSS-REFERENCE TO RELATED APPLICATIONS

This application is a national phase application under 35 U.S.C. § 371 of International Application No. PCT/IB2010/000386 filed 11 Feb. 2010. The entire text of the above-referenced disclosure is specifically incorporated herein by reference without disclaimer.

BACKGROUND OF THE INVENTION

1. Field of the Invention

Embodiments of the invention include methods for the production of porous membranes. In particular aspects the methods are directed to producing polymeric porous membranes having a narrow pore size distribution. The manufacture of the porous membranes of the present invention can be efficient and cost-effective. Porous membranes produced using the materials and methods described herein can be utilized in water purification, healthcare, as well as many other industrial applications.

2. Description of the Related Art

Most of the currently available porous membranes for ultrafiltration are being produced by the so-called phase inversion process (non-solvent induced phase separation). These membranes have a more or less large statistical distribution of pores with different diameters, see S. Nunes, K.-V. Peinemann (ed.): Membrane Technology in the Chemical Industry, Wiley-VCH, Weinheim 2006, pages 23-32. This broad pore size distribution has two disadvantages: (1) Such membranes do not permit precise separation of molecules with similar molecular weights. (2) Membranes with a broad pore size distribution often show a large reduction of flux due to pore blocking (or fouling) of the larger pores. This happens, because most of the liquid passes through the pores with large diameter. According to the law of Hagen-Poiseuille the flux is proportional to the fourth power of the pore radius. Therefore, great effort has been expended and complex methodologies used to produce membranes with a low variance in the distribution of their pore size.

The following methods have been described:

Bacterial envelope method. Isoporous membranes have been produced using bacterial envelopes, so-called S-layers (Sleytr et al.: Isoporous membranes from bacterial cell envelope layers, Journal of Membrane Science 36, 1988). Due to their narrow pore size distribution these membranes have good separation properties. However, these membranes are not commercially feasible because they are difficult to produce on large scale and they are not long-term stable.

Electrolytic oxidation of aluminum. Another method used to produce membranes with low variance in the distribution of their pore size is the electrolytic oxidation of aluminum (R. C. Furneaux et al.: The formation of controlled porosity membranes from anodically oxidized aluminium, Nature 337, 1989, pages 147-149. These membranes are produced on commercial scale and they are offered, for example, under the trade name Anopore™. A significant disadvantage of these membranes is that they are very fragile.

Track-etching. Dense films of polycarbonate or poly(ethylene terephtalate) can be transformed into porous microfiltration membranes with narrow pore size distribution by exposing them to fission fragments from radioactive decay with subsequent etching in alkaline solution (track-etched membranes). The maximum pore density is limited by the fact that membranes become very brittle at very high doses.

Breath figures. Another approach to manufacture of isoporous membranes utilizes so-called breath figures (Srinivasaro et al.: Three dimensionally ordered array of air bubbles in a polymer film, Science 292, 2001, pages 79-83). A moist gas stream is directed in a controlled manner over a solvent-containing polymer film. The pores are created through condensation of water droplets on the surface of the polymer film. This method cannot be used to produce ultrafiltration membranes because it is not possible to obtain pores with a sufficiently small diameter.

Self assembly. A newer method for the production of isoporous membranes is based on the ability of block copolymers to self-assemble into well-ordered structures (T. P. Russel et al.: Nanoporous membranes with ultrahigh selectivity and flux for the filtration of viruses, Advanced Materials 18, 2006, pages 709-712). Block copolymers consist of two or more blocks of different polymers, which are covalently linked. Depending on the compatability of the blocks, the blocks will separate when a film is formed from a solution comprising the block copolymer. However, the length scale of separation is limited because the blocks are connected. This process is therefore called microphase separation. Depending on the nature of the block copolymer different morphological patterns may be formed like spheres or cylinders in a matrix or a lamellar structure. In the method described by Russell et al. an A-B diblock copolymer is dissolved in a solvent together with a certain amount of homopolymer B. Through the controlled evaporation of the solvent, films can form on a solid support like a silicon wafer, which have cylinders arranged regularly and perpendicular to the surface. Homopolymer B is extracted from these films using a selective solvent, so that a nanoporous film is generated. The film can now be detached by water and transferred to a porous carrier. This creates a composite membrane with an isoporous separation layer. This method is very complex due to the multitude of steps. This method does not allow the production of membranes on an industrial scale and at a competitive price.

A simpler method for the production of isoporous membranes also based on the self-assembly ability of block copolymers has been described by Peinemann et al. (Asymmetric superstructure formed in a block copolymer via phase separation, Nature Materials 6, 2007, pages 992-996, see also US Patent publication 20090173694 (the '694 application)). In this work, the above described microphase separation of a block copolymer is combined with the conventional membrane formation process of non-solvent induced phase separation. A concentrated block copolymer solution is cast as a film, which is then after a short evaporation time precipitated in a non-solvent, preferably water. By this method an asymmetric membrane has been obtained consisting of a non-ordered porous support covered by a highly ordered nanoporous separation layer. However, the method has been difficult to reproduce. When the procedure described in the '694 application is applied to commercially available purified block copolymers it does not lead to isoporous membranes.

SUMMARY OF THE INVENTION

Embodiments of the invention provide methods for making asymmetric membranes or polymer material with a separation layer containing well defined pores a narrow pore size distribution and a support layer. The method generally comprises one or more of the following steps:

(A) preparing a copolymer solution using one or more organic solvents. Optionally, the solution can further comprise a second polymer such as a homopolymer or other polymer compatible with the self-assembly process. The second or additional polymer can enlarge the diameter of the cylinders or sphere structures formed during microphase separation. This second polymer is soluble in a solvent that does not dissolve the membrane or polymer structure. Such a solvent can be used to extract the second or additional polymer after membrane formation. In certain aspects, the second or additional polymer is a homopolymer of the cylinder forming block of the block copolymer, e.g. a poly (4-vinylpyridine). The second polymer need not be a homopolymer. Typically, the second polymer is removed or extracted from the membrane or polymer material. In certain aspects, the copolymer comprises at least two polymer blocks that are incompatible. In a further aspect, one of the blocks comprises monomer units that can form complexes or coordinate with metal ions, e.g., polyvinylpyridine or polyethyleneglycol. In still a further aspect, the copolymer solution includes a metal salt.

(B) Casting the copolymer solution into a casting structure such as a film or thread. After forming a casting structure the structure can be incubated for a period of time to allow for evaporation of the solvent. Evaporation can be for at least, at most, or about 0.1, 1, 2, 3, 4, 5, 6, 7, 8, 9, 10, 20, 30, 40, 50, or 60 seconds or more.

(C) Immersing the casting structure in a non-solvent for the block copolymer. In certain aspects the non-solvent is miscible with the solvent(s) used for preparation of the casting solution. An asymmetric membrane is formed by the non-solvent induced phase separation.

Certain embodiments include methods for manufacturing a polymer material comprising the steps of: (a) forming a casting structure comprising (i) a block copolymer of at least two incompatible polymer blocks, the block copolymer having a polymer dispersity index of 1.4 or less, wherein at least one of polymer blocks is capable of forming a coordination complex with a metal, and (ii) a metal salt; and (b) immersing the casting structure in a non-solvent, wherein the casting structure forms a polymer material comprising (i) a first layer having periodically ordered pores formed by ordered cylindrical structures or aligned interconnected sphere structures that extend below the surface and have a long axis perpendicular to the surface; and (ii) a second layer comprising a support layer. In certain aspects the casting structure is a sheet or a column. The block copolymer can comprise a first polymer block that can include, but is not limited to polystyrene, polysulfone, poly-4-vinylpyridine, poly-2-pyridine, polyalkyleneoxide, polymethacrylic acid, polacrylic acid, polyanilin, polypyrrole, polytriazole, polyvinylimidazole, polytetrazole, polyethylenediamine, polyvinylalcohol, polyvinylpyrrolidone, polyoxadiazole, polyvinylsulfonic acid, polyvinylphosphonic acid, or polymers with quaternary ammonium groups. In a further aspect, a metal salt can include, but is not limited to a copper, cobalt, nickel, iron, silver, zinc, palladium, platinum, gold, chromium, ruthenium, zirconium, molybdenum, titanium, aluminum, or cadmium salt. The copolymer or casting solution can be dissolved in dimethylformamide, dimethylacetamide, N-methylpyrrolidone, dimethylsulfoxide, or tetrahydrofurane solvent, mixtures thereof, or other such solvents.

In certain aspects, the block copolymer solution can comprise at most, at least, or about 5, 6, 7, 8, 9, 10, 11, 12, 13, 14, 15, 16, 17, 18, 19, 20 wt % to about 15, 16, 17, 18, 19, 20, 21, 22, 23, 24, 25, 26, 27, 28, 29, 30, 35, 40 wt % of the total weight of the solution, including all values and ranges there between.

In a further aspect, the block copolymer solution comprise at least, at most, or about 0.01, 0.02, 0.03, 0.04, 0.05, 0.06, 0.07, 0.08, 0.09, 0.1, 0.5, 1, 1.5, 2, 3 wt % to about 1, 2, 3, 4, 5, 10 wt % of the total weight of the solution, including all values and ranges there between.

The copolymer solution can further comprise an additional polymer. In certain aspects the additional polymer can be extracted from a polymer material after the polymer material is formed. In certain aspects the additional polymer is a homopolymer. The additional polymer will be compatible with at least one of the copolymers.

The methods can further comprise extracting a metal from a polymer material after the polymer material is formed.

In certain aspects, the invention includes a polymeric material produced using the methods described herein. Polymeric material include, but is not limited to membranes and columns. In certain aspects, the surface of the polymeric material will have a maximum pore diameter ($d_{max}$) to minimum pore diameter ($d_{min}$) ratio ($d_{max}/d_{min}$) of about 1, 1.5, 2, 2.5 to 2, 2.5, 3, including all values and ranges there between.

In a further aspect the invention includes polymer casting solutions comprising (i) a block copolymer of at least two incompatible polymer blocks, the block copolymer having a polymer dispersity index of 2, 1.5, 1.4 or less, wherein at least one of polymer blocks is capable of forming a coordination complex with a metal, and (ii) a metal salt.

Polymer materials described herein or made using the described processes can be used in a variety of devices and apparatus. Such devices and apparatus include ultrafiltration or nanofiltration devices or apparatus as well as time release drug delivery devices.

Other embodiments include methods of using the materials described herein, such as methods for ultrafiltration or nanofiltration of a fluid, comprising flowing the fluid through a material described herein or made by a described process. For example, the compositions described herein can be used in filtering a fluid that contains proteins, viruses, or other dissolved components, by flowing the fluid through or across material described herein.

Embodiments of the invention also include isoporous membranes produced using the described methods. In certain aspects, an isoporous membrane or other material described herein will have a surface or surface layer having a $d_{max}/d_{min}$ of about 0.5, 1, 2 to 3, 3, or 4, including all values and ranges there between. In certain embodiments the diameter of the pores after formation can be manipulated by changing the environment in which the membrane is placed, e.g., pH changes can be used to open and close pores positioned on the surface of the polymer material.

Other embodiments of the invention are discussed throughout this application. Any embodiment discussed with respect to one aspect of the invention applies to other aspects of the invention as well and vice versa. The embodiments in the Example section are understood to be embodiments of the invention that are applicable to all aspects of the invention.

The use of the word "a" or "an" when used in conjunction with the term "comprising" in the claims and/or the specification may mean "one," but it is also consistent with the meaning of "one or more," "at least one," and "one or more than one."

It is contemplated that any embodiment discussed herein can be implemented with respect to any method or composition of the invention, and vice versa. Furthermore, compositions and kits of the invention can be used to achieve methods of the invention.

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or." It is also contemplated that anything listed using the term "or" may also be specifically excluded.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

DESCRIPTION OF THE ILLUSTRATIVE EMBODIMENTS

Figure 1:
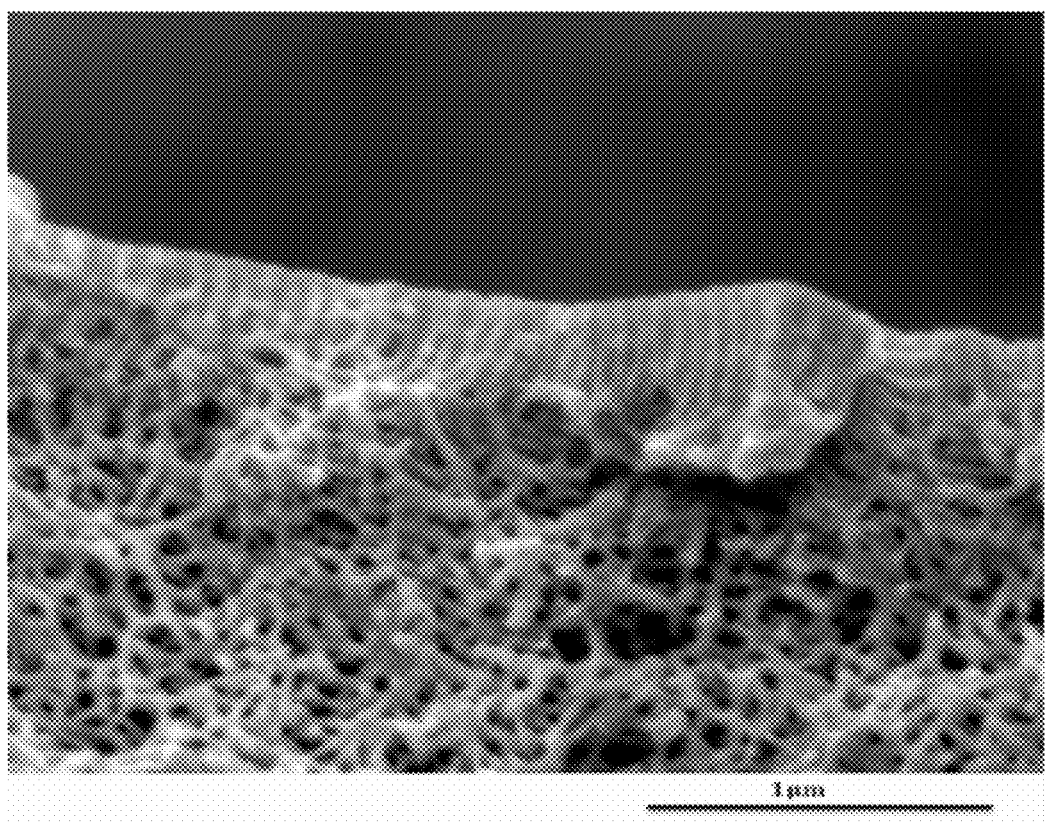
FIG. 1 Is a SEM micrograph of a cross-section of a membrane made from a polystyrene-b-poly(4-vinylpyridine) copper complex (MW polystyrene block: 138,000, MW poly(4-vinylpyridine block 41,000).
Figure 2:
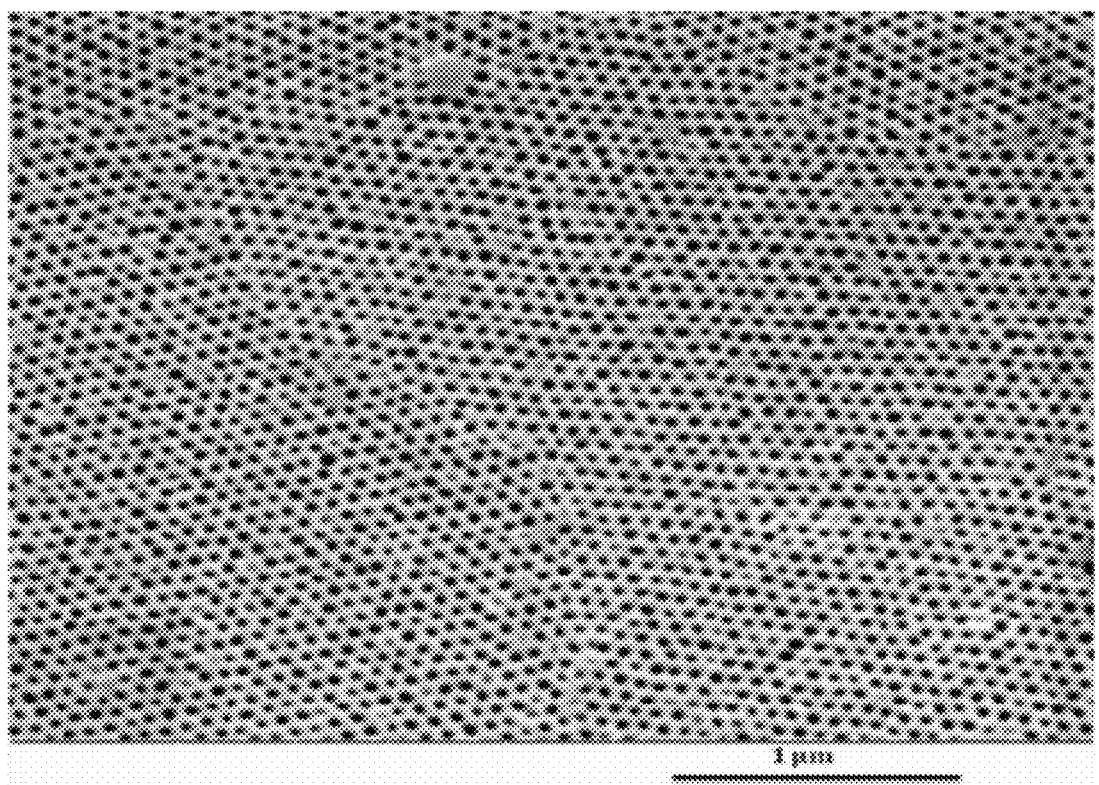
FIG. 2 Is a SEM micrograph of the surface of the membrane. The surface pores have a substantially uniform diameter, the pore density is very high.
Figure 3:
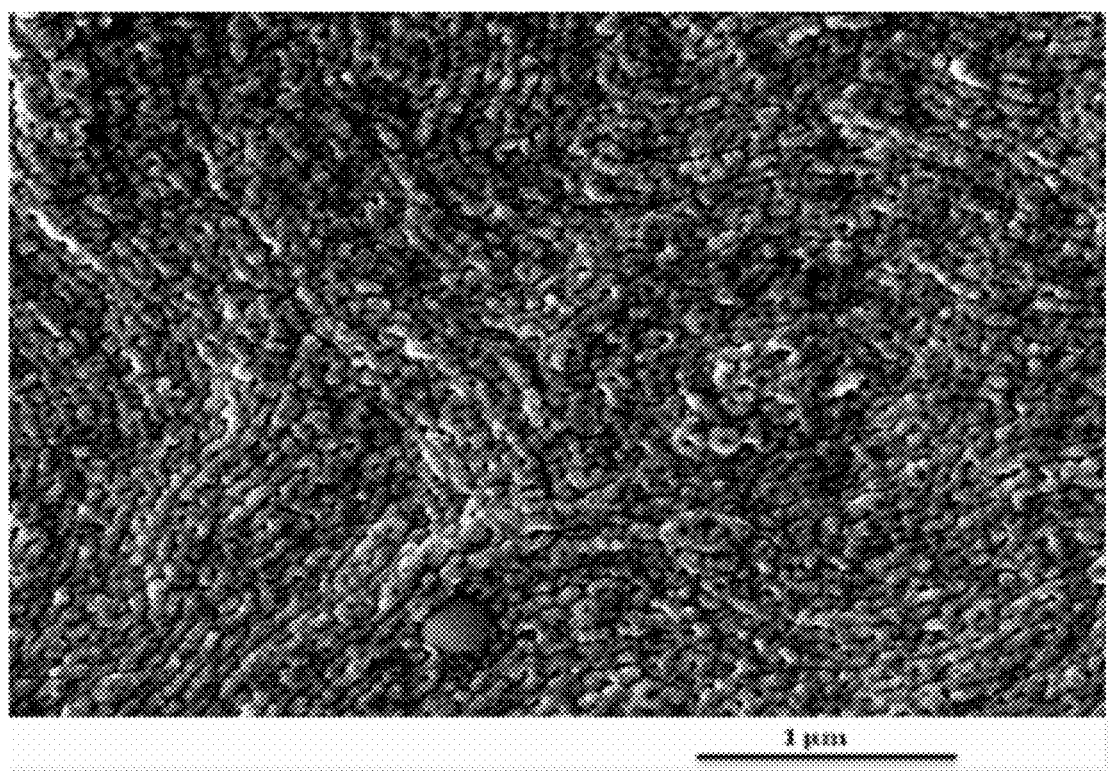
FIG. 3 Is a SEM micrograph of the surface of the membrane, which has been prepared without addition of a metal salt.

Embodiments of the invention provide methods and compositions related to isoporous membranes and other polymeric material having an isoporous surface layer and a supporting layer. Isoporous membranes are suitable for ultrafiltration or nanofiltration of dissolved substances, colloidal particles, proteins, viruses and the like. The methods described herein are simple and cost-effective.

One embodiment of the methods for producing of a polymer material yields a polymer membrane having an isoporous surface layer and a supporting layer. Such a membrane can be use as an ultrafiltration or a nanofiltration membrane. The method includes dissolving one or more polymers, at least one of which is a block copolymer, in a fluid to produce a casting solution. A block copolymer is a polymer made up two or more polymerized monomer blocks. In certain aspects, the block copolymer may consist of two or three different polymer blocks with at least two blocks being incompatible and result in microphase separation. In a further aspect, one block is hydrophobic and the other hydrophilic. The block copolymer should have a narrow molecular weight distribution. The polymer dispersity index (PDI) should be smaller than 1.5, 1.4, 1.3 or less. In certain embodiments one of the polymer blocks comprises functional groups that form coordination complexes or salts with metal ions. Examples of such polymer blocks includes, but is not limited to polyvinylpyridine, polyanilin, polypyrrole, polytriazole, polyhydrazide, polyethylene glycol and polyacrylic acid. The concentration of the block copolymer in the above mentioned casting solution should be higher than or about 5, 10, 15, or 20 wt % to between 15, 20 or 25 wt %, including all values and ranges there between. In certain aspects the casting solution contains a soluble metal salt that forms a complex or salt with one of the block copolymers. In certain aspects the molecular weight of the block copolymer is between, at most, at least, or about 10, 20, 40, 60, 80, 100 and 200, 300, 350, 400, to 800 kDa. Examples for suitable metal ions are $Cu^{2+}$, $Co^{2+}$, $Fe^{2+,3+}$, $Ni^{2+}$, $Zn^{2+}$, $Pb^{2+}$, $Cd^{2+}$, $Ag^+$, $Au^{2+}$, and $Pd^{2+}$.

The casting solution comprises at least one solvent for at least one of the block copolymers. The casting solution can include one or more solvents. The solvents are typically polar solvents and include those solvents miscible with water. Examples of such solvents include, but are not limited to dimethylformamide, dimethylacetamide, N-methylpyrolidone, dimethylsulfoxide and tetrahydofuran.

The casting solution is a viscous solution that can be manipulated to form a casting structure, such as a sheet, a thread or a column. To form a sheet the casting solution is spread out into a thin film (typical thickness 50, 75, 100, 125, 150 to 125, 150, 175, 200, 225, 250 µm or thicker, including all values and ranges there between). Aspects of the invention include a short evaporation time after the casting solution is formed into a casting structure (typically 5 to 60 s). After the casting structure is prepared it is immersed into a non-solvent bath, preferably water. A non-solvent is a solution or liquid in which the block copolymer is not sufficiently soluble, thus phase separation of the polymer in the casting structure is induced by immersion in the non-solvent. By non-solvent induced phase separation an asymmetric polymer material is formed. This polymer material consists of a porous substructure (support layer) covered by a thin layer with a highly ordered pore structure (isoporous layer) containing cylinders or aligned interconnected spheres oriented perpendicular to the membrane surface. The cylindrical structures are formed by the hydrophilic block of the block copolymer. The diameter of the pore formed by this structure vary very little in diameter.

Without wishing to be bound by any specific theory, the method described herein is believed to be a combination of macrophase separation due to the immersion in the non-solvent bath and of microphase separation due to the self-assembly of the block copolymer. The latter leads to the formation of the highly ordered surface layer.

In some embodiments the final pore structure of the top-layer or surface layer is formed upon drying. The hydrophilic polymer shrinks and creates a pore, which is lined by the hydrophilic polymer (see example 1). In other embodiments a hydrophilic homopolymer with the same composition as the hydrophilic block is added to the casting solution. This homopolymer can be extracted after membrane formation leading to larger pores if so desired.

I. EXAMPLES

The following examples are included to demonstrate particular embodiments of the invention. It should be appreciated by those of skill in the art that the techniques disclosed in the examples which follow represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the invention.

Example 1

The block copolymer polystyrene-b-poly-4-vinylpyridine (PS-b-P4VP, Polymer Source, Inc., Product No. P5722) is dissolved in a mixture of dimethylformamide (DMF) and tetrahydrofurane (THF) to provide a casting solution. The PS-b-P4VP had a molecular weight of 179 kDalton, molecular weight of the PS-and the P4VP blocks were 138 and 41 kDalton respectively. The polydispersity index (PDI) was 1.15. The composition of the casting solution is 20 wt. % PS-b-P4VP, 56 wt. % DMF, 24 wt. % THF and 0.16 wt. % anhydrous copper acetate.

The casting solution is spread to a 200 μm thick film on a glass plate. After 10 seconds of free evaporation at room temperature the film is immersed in a water bath. The membrane solidifies within seconds and is removed after 3 hours washing time. Phase separation can be performed at temperatures of at least, at most, or about 0, 5, 10, 15, 20, 25, 30, 35, 40, 50, 60, 70, 80° C. including all values and ranges there between.

Example 2

A control membrane is prepared using the methods of example 1 with the exception of copper acetate, which is not included in the casting solution.

* * *

All of the compositions and/or methods disclosed and claimed herein can be made and executed without undue experimentation in light of the present disclosure. While the compositions and methods of this invention have been described in terms of some embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. A method for manufacturing a polymer material with a narrow pore size distribution comprising the steps of:
   (a) forming a casting structure including (i) a metal salt including a metal ion for rapid membrane formation, (ii) a block copolymer of at least two incompatible polymer blocks, wherein at least one of the polymer blocks forms a coordination complex with the metal ion and at least one of the polymer blocks is a cylinder-forming block, and (iii) a second polymer; and
   (b) immersing the casting structure in a non-solvent to form a polymer material via self-assembly of the block copolymer and non-solvent induced phase separation, wherein the polymer material is an asymmetric membrane including (i) a first layer including periodically ordered pores formed by ordered cylindrical structures or interconnected spheres that extend below the surface and have a long axis perpendicular to the surface; and (ii) a second layer comprising a support layer, wherein a ratio of a maximum pore diameter to a minimum pore diameter of the first layer is 3 or less;
   wherein the block copolymer includes polystyrene and one or more of poly-4-vinylpyridine, and poly-2-vinylpyridine;
   wherein the second polymer is a homopolymer of the cylinder-forming block of the block copolymer.

2. The method of claim 1, wherein the casting structure is a sheet.

3. The method of claim 1, wherein the casting structure is a column.

4. The method of claim 1, wherein the metal salt is a copper, cobalt, nickel, iron, silver, zinc, palladium, platinum, gold, chromium, ruthenium, zirconium, molybdenum, titanium, aluminum, or cadmium salt.

5. The method of claim 1, wherein the casting structure comprises a dimethylformamide, dimethylacetamide, N-methylpyrrolidone, dimethylsulfoxide, or tetrahydrofuran solvent or a mixture thereof.

6. The method of claim 1, wherein the concentration of block copolymer in the casting structure is about 10 wt % to about 30 wt % of the total weight of the casting structure.

7. The method of claim 1, wherein the concentration of metal salt in the casting structure is about 0.05 wt % to about 5 wt % of the total weight of the casting structure.

8. The method of claim 1, wherein the casting structure further comprises a homopolymer that can be extracted from the polymer material after the polymer material is formed.

9. The method of claim 1, further comprising extracting the metal salt from the polymer material after the polymer material is formed.

10. The method of claim 1, wherein rapid membrane formation includes forming a membrane in less than 12 hours.

11. The method of claim 1, wherein the ratio of the maximum pore diameter to the minimum pore diameter of the first layer is less than 2.5.

12. The method of claim 1, wherein the ratio of the maximum pore diameter to the minimum pore diameter of the first layer is less than 2.

13. The method of claim 1, wherein the ratio of the maximum pore diameter to the minimum pore diameter of the first layer is less than 1.5.

14. The method of claim 1, wherein the ratio of the maximum pore diameter to the minimum pore diameter of the first layer is less than 1.

15. The method of claim 1, wherein the block copolymer has a polymer dispersity index of 1.4 or less.

* * * * *